United States Patent [19]

Tsutsui et al.

[11] 4,165,663
[45] Aug. 28, 1979

[54] VERTICAL BANDSAW MACHINE WORK FEED

[75] Inventors: Kikuo Tsutsui, Isehara; Masao Sato, Hadano, both of Japan

[73] Assignee: Amada Company, Limited, Isehara, Japan

[21] Appl. No.: 861,617

[22] Filed: Dec. 19, 1977

[30] Foreign Application Priority Data

Dec. 25, 1976 [JP] Japan .................. 51-157014

[51] Int. Cl.$^2$ ............................. B26D 7/06
[52] U.S. Cl. ............................. 83/74; 83/401; 83/416; 83/788
[58] Field of Search ............ 83/74, 72, 62, 401, 83/416, 788

[56] References Cited

U.S. PATENT DOCUMENTS

| 2,815,561 | 12/1957 | Crane | 83/74 |
| 3,077,132 | 2/1963 | Whitmore | 83/74 |
| 3,190,159 | 6/1965 | Wilkie et al. | 83/74 X |
| 3,259,155 | 7/1966 | Kawabata | 83/74 X |
| 3,801,089 | 4/1974 | Fukugami | 83/74 |

Primary Examiner—Frank T. Yost
Attorney, Agent, or Firm—Thompson, Birch, Gauthier & Samuels

[57] ABSTRACT

A vertical bandsaw machine having a feed mechanism with a driving component movable in opposite directions in response to the application thereto of hydraulic fluid pressure. A workpiece engaging element urges the workpiece towards the cutting blade in response to movement of the driving component in one direction, while accommodating movement of the workpiece away from the cutting blade during movement of the driving component in the opposite direction. The application of hydraulic fluid pressure to the driving component is controlled by valves which are both manually adjustable and automatically responsive to the forces opposing workpiece movement towards the cutting blade.

7 Claims, 2 Drawing Figures

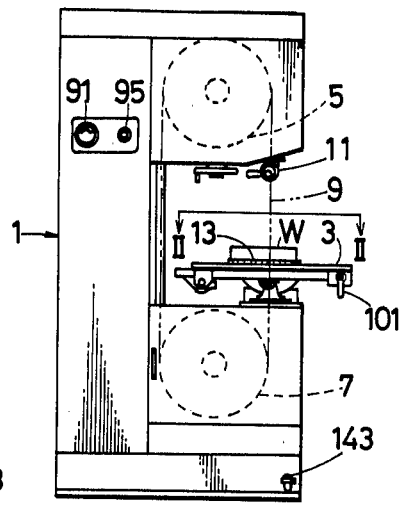
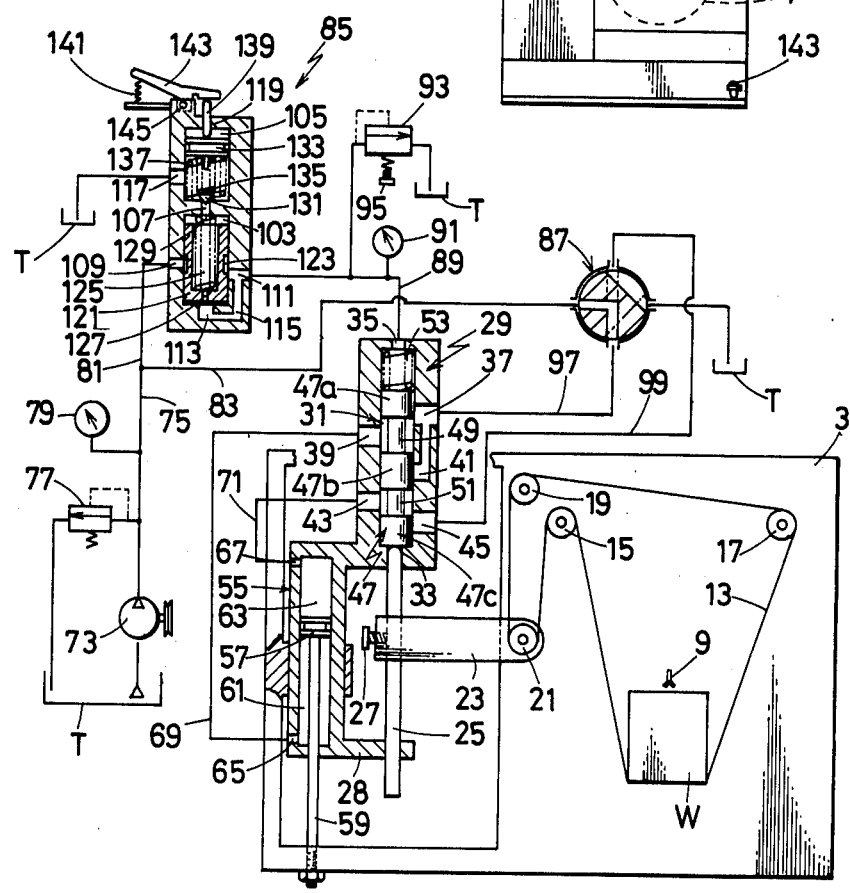

VERTICAL BANDSAW MACHINE WORK FEED

BACKGROUND OF THE INVENTION

1. Field of the Invention

The present invention relates generally to saws, typically that type of saw having a vertically movable cutting blade such as for example a vertical bandsaw machine, jigsaw or the like, and more particularly to a feed mechanism for urging a workpiece towards the cutting blade during a cutting operation.

2. Description of the Prior Art

The invention is particularly suited for, although not limited to, use on a vertical bandsaw machine of generally conventional design. This type of saw has an endless cutting blade trained over vertically spaced wheels or pulleys, one of which is usually driven. The cutting blade passes vertically through an opening in a horizontable table on which is supported the workpiece to be cut.

In industrial applications where the workpieces are very heavy, feed mechanisms are sometimes employed to assist operating personnel in the task of feeding and manipulating the workpieces during a cutting operation. Such assistance is particularly necessary where the cutting operations are complex, involving intricate curved cutting lines, where resistance to forward movement of the workpiece varies over a wide range, and where it is frequently necessary to partially rotate, stop and/or reverse the movement of the workpiece in order to follow curved portions of the cutting line.

Prior attempts at providing feed mechanisms capable of operating satisfactorily under these difficult conditions have failed to adequately satisfy the demands of those skilled in the art. Accordingly, manual feeding is still widely relied upon.

SUMMARY OF THE INVENTION

A primary object of the present invention is the provision of a feed mechanism for moving a workpiece towards the cutting blade at a rate which is both manually adjustable and automatically responsive to the forces opposing forward workpiece movement.

Another object of the present invention is the provision of a feed mechanism which can be readily slowed, stopped or reversed, as the occasion demands during a particular cutting operation.

Still another object of the present invention is the provision of a feed mechanism having workpiece engaging means capable of adjustment to accommodate a wide range of workpiece sizes and shapes.

In the preferred embodiment to be hereinafter described in greater detail, the aforesaid objectives are accomplished by providing a feed mechanism having a driving component movable in opposite directions parallel to the plane of the cutting blade in response to the application thereto of hydraulic fluid pressure. A workpiece engaging element urges the workpiece towards the cutting blade in response to movement of the driving component in one direction, while accommodating movement of the workpiece away from the cutting blade during movement of the driving component in the opposite direction. The application of hydraulic fluid pressure to the driving component is controlled by valves which are both manually adjustable and automatically responsive to the forces opposing workpiece movement towards the cutting blade.

Preferably, the aforesaid valves include a servo-valve assembly which is carried by and movable with the driving component.

Preferably, the driving component is the cylinder of a piston-cylinder assembly, with the piston of said assembly being fixed relative to the table supporting workpiece.

The servo-valve assembly may conveniently comprise a valve body which is connected to and movable with the cylinder or driving component, and a valve spool axially movable within the valve body in a direction parallel to the direction of movement of the cylinder.

The workpiece engaging means may conveniently comprise an endless flexible element, for example a chain, which is trained around a plurality of rotatable idlers. Some of these idlers are strategically placed at stationary locations on the table supporting the workpiece, and at least one of the idlers is carried on an arm extending laterally from an elongated rod. The rod is axially reciprocal in a direction parallel to the plane of the cutting blade and the direction of movement of the driving cylinder, and is acted upon by the valve spool of the control valve. The valve spool is preferably acted upon by hydraulic fluid pressure in a direction opposite to the force exerted thereon by the aforesaid rod.

Preferably, the position of the arm may be adjusted along the length of its supporting rod in order to accommodate different-sized and/or shaped workpieces. The fluid pressure acting on the valve spool is preferably adjusted manually by a control valve, and is kept below a variable maximum level by a manually adjustable relief valve.

Other objects and advantages of the present invention will be apparent from the following description and accompanying drawings which, by way of illustration, show a preferred embodiment of the present invention applied to a vertical bandsaw.

BRIEF DESCRIPTION OF THE DRAWINGS

FIG. 1 is a front elevational view of a vertical bandsaw with a feed mechanism embodying the concepts of the present invention; and, FIG. 2 is a schematic illustration of the feed mechanism and the hydraulic circuitry associated therewith, with the worktable, workpiece and workpiece engaging means viewed from a plane at lines 2—2 of FIG. 1.

DESCRIPTION OF PREFERRED EMBODIMENT

Referring now to FIG. 1, a generally conventional vertical bandsaw is shown comprising a C-shaped frame 1 with a horizontal worktable 3 on which is supported a workpiece W. The frame 1 supports upper and lower wheels or pulleys 5, 7. An endless bandsaw blade 9 is trained around the wheels 5, 7 and is guided by a conventional guide means 11. Although not shown, it will be understood that one of the wheels 5, 7 is driven in a conventional manner.

During a cutting operation, the workpiece W is pushed into engagement with the bandsaw blade 9 and the workpiece is manipulated so that the blade follows the appropriate cutting line for the pattern being cut.

Referring now to FIG. 2, it will be seen that the workpiece W is pulled into engagement with the bandsaw blade 9 by means of a workpiece engaging means comprised in part of an endless flexible element which may typically comprise a chain 13. The chain is trained around a plurality of idler sprockets 15, 17, 19 and 21.

The sprockets 15, 17 and 19 are supported at stationary locations on a worktable 3, whereas the sprocket 21 is carried on an arm 23. As will hereinafter be explained in greater detail, the arm 23 is movable in opposite directions parallel to the cutting plane of the bandsaw blade 9. Thus, when the arm member 23 is moved in one direction towards the front of the worktable, the chain 13 is acted upon by the sprocket 21 and is pulled around the sprockets 15, 17 and 19 with the result that the workpiece is pulled towards the bandsaw blade 9. Because the chain 13 is flexible and movable over its supporting sprockets, the workpiece W may be rotated and manipulated with respect to the cutting edge of the bandsaw blade 9 to thereby accommodate any complicated or intricate cutting pattern. While the flexible endless element 13 has been described as comprising a chain, it will be understood that other types of flexible elements such as for example belts could also be employed.

The arm member 23 is carried on a rod member 25 which is mounted for reciprocal axial movement in a direction parallel to the cutting plane of the bandsaw blade 9. The position of the arm 23 may be adjusted along the length of the arm 25 by means of a conventional screw-type clamp 27. In this manner, the length of the chain 13 forming the loop between sprockets 15 and 17 can be adjusted in order to accommodate a wide range of workpiece sizes and shapes.

The rod member 25 is supported at one end as at 28 and at the opposite end by a servo-valve assembly which is generally designated by the reference numeral 29.

The servo-valve assembly has an elongated valve housing forming an interior spool chamber 31. A bore 33 at the forward end of the valve housing communicates with the spool chamber 31 and axially receives the end of the axially reciprocal rod member 25. The valve housing is further provided at its rearward end with a port 35, and additional side ports 37, 39, 41, 43 and 45. The ports 37, 39, 43 and 45 extend radially outwardly from the spool chamber 31, whereas the port 41 is connected by an intermediate passageway to the port 37.

A spool 47 is slidably contained in the spool chamber 31. The spool is generally cylindrical and appropriately grooved to provide reduced diameter sections 49, 51 and larger diameter sections 47a, 47b and 47c. A spring 53 located between the rearward end of the spool chamber 31 and the larger diameter section 47a acts to bias the spool 47 towards the bore 33 where the end of the axially reciprocal rod member 25 is slidably held. With the spool 47 in the position shown in FIG. 2, the ports 37 and 39 are in communication with one another via the portion of the spool chamber 31 occupied by the reduced diameter section 49 of the spool. The port 41 is blocked by a larger diameter spool portion 47b, and the ports 43, 45 are in communication again via the portion of the spool chamber occupied by the reduced diameter spool section 51.

In the event that the spool 47 is axially displaced against the biasing action of the spring 53, the port 45 will be gradually closed off by the larger diameter spool section 47c, after which the port 41 will be gradually opened. However, the ports 31, 39 and 43 will always remain in communication with the spool chamber 31 regardless of the position of the valve spool 47.

A hydraulic cylinder 55, hereinafter referred to at times as a "driving component," is integrally fixed to the servo-valve assembly 29 so as to move in opposite directions parallel to the reciprocating motion of the rod member 25. The cylinder 55 contains a piston 57 having a piston rod 59 which is fixed to the worktable 3. The piston 57 thus divides the cylinder 55 into two chambers 61, 63. A port 65 is in communication with chamber 61, and a port 67 is in communication with chamber 63. The ports 65 and 67 are connected with the ports 39 and 43 of the servo-valve assembly 29, respectively, by means of conduits 69 and 71. Thus, the hydraulic cylinder 55 will move the servo-valve assembly 29 integrally fixed thereto, when either of the chambers 61 or 63 is supplied with pressurized hydraulic fluid being received via the servo-valve assembly 29.

The servo-valve assembly 29 is supplied with hydraulic fluid by a pump 73 fed by a tank T. The pump 73 has a discharge conduit 75 which is provided with a relief valve 77 and a pressure gauge 79. Conduit 75 divides into two branch conduits 81, 83, with the conduit 81 leading to a hydraulic control valve assembly 85, while the conduit 83 leads to a directional control valve 87.

The hyraulic control valve assembly 85 operates to reduce the pressure of the hydraulic fluid passing therethrough to a secondary control pressure, which is then directed to the port 35 of the servo-valve assembly 29 via conduit 89. In order to further regulate the pressure of the hydraulic fluid in conduit 89, a pressure gauge 91 is provided together with a pressure regulating relief valve 93. The pressure regulating relief valve 93 is so designed as to be manually adjustable by a knob 95, this adjustment being primarily to accommodate different widths of bandsaw blades 9. As is best shown in FIG. 1, the pressure gauge 91 and the control knob 95 of the pressure regulating relief valve 93 are located at the front of the bandsaw.

The directional control valve 87 may be selectively set to three different positions in order to change or stop the flow of hydraulic fluid to the servo-valve assembly 29. More particularly, conduits 97 and 99 lead from the valve 87 to the ports 37, 35, respectively of the servo-valve assembly 29. Thus, the valve 87 is so arranged as to connect either of the conduits 97, 99 with the conduit 83 while at the same time connecting the other of the conduits 97, 99 to the tank T. A third setting of valve 87 would close off all of the conduits 83, 97 and 99. When adjusted to the position shown by the solid lines in FIG. 2, the directional control valve 87 will connect the conduit 83 with the conduit 97 and the conduit 99 with tank T. However, when the same valve is adjusted to the condition shown by the phantom lines, conduit 83 will be connected with conduit 99 and conduit 97 will be connected to the tank T. If the valve 87 is adjusted to a position intermediate the aforesaid positions, all conduits 83, 97 and 99 will be closed off.

Preferably, the control valve 87 is operated by a lever 101 located in the position shown in FIG. 1 so as to be conveniently accessible to the bandsaw operator.

The hydraulic control valve assembly 85 has a valve housing forming a spool chamber 103 and a valve chamber 105 arranged coaxially with each other. The spool chamber 103 and valve chamber 105 are connected by a passage 107 extending through an intermediate wall. The spool chamber 103 has a radial port 109 to which is connected conduit 81. Another radial port 111 is connected to conduit 89. A passageway 113 leads from the bottom end of the spool chamber 103 and connects with a passageway 115 leading to the outlet port 111. The valve chamber 105 has a port 117 which is connected to the tank T. An additional bore 119 leads vertically outwardly from the valve chamber 105.

A valve spool 121 is slidably contained within the spool chamber 103. The spool 121 has a circumferential groove 123 which allows the inlet port 109 to communicate with the outlet port 111. The spool 121 is additionally provided with an axially extending passageway 125 in communication at opposite ends with passageways 107 and 113. Passageway 125 contains a spring 129 which biases the spool 121 towards the passageway 113. When the spool 121 is fully biased in its lowermost position as shown in FIG. 2, the circumferential groove 123 is directly opposite to inlet port 109 while being only partially open to outlet port 111. Thus, the hydraulic fluid being received via conduit 81 will undergo a reduction in pressure as it progresses through inlet port 109, across groove 123 and out through port 111.

A conical valve member 131 is located at the bottom of valve chamber 105. The valve member 131 is seated in the upper end of passage 107 by means of a piston 133 acting through a spring 135. The piston 133 is biased in a direction away from the valve 131 by a second spring 137 surrounding the spring 135. The piston 133 is further acted upon by a rod member 139 extending slidably through the top bore 119. The rod member 139 is pressed against the piston 133 by another spring 141 acting through a lever 143. The spring 141 is stronger than the springs 137 and 135, and thus absent any pressure being exerted on the lever 143, the piston 133 will act through its cooperating spring to maintain the valve member 131 in its seated position. However, any depression of the lever 143 will automatically reduce the seating force being exerted on the valve member 131.

When the lever 143 is depressed, a certain amount of hydraulic fluid under the secondary reduced pressure will return from outlet port 111 via passageway 115, passageway 113 and the passageway in the spool 121 to exert an upward force on the valve member 131. Hydraulic fluid passing by valve 131 will exit through port 117 to tank T. Preferably, the lever 143 comprises a foot peddle mounted as shown in FIG. 1 at the front of the bandsaw.

In preparation for a cutting operation, the workpiece W is first located on the worktable 3 in front of the bandsaw blade 9. The chain 3 is then passed around the back of the workpiece W and the slack is taken up by adjusting the position of the arm member 23 on its supporting rod member 25. Also, the directional control valve 87 is set to the position shown by the solid lines in FIG. 2 by manipulating the lever 101. Finally, the pressure regulating relief valve 93 is set to the width of the bandsaw blade 9 being used.

Then, the hydraulic pump 73 is started and hydraulic fluid is directed through pump discharge conduit 75 and its communicating conduit 81 to the hydraulic control valve assembly 85. Hydraulic fluid is also directed through conduit 83, directional control valve 87 and conduit 97 to the servo-valve assembly 29.

The hydraulic fluid passing through control valve assembly 85 undergoes a pressure reduction to a secondary control pressure as previously described. The fluid at said secondary control pressure then flows through conduit 89 into the spool chamber 31 via port 35 where it is applied to the end of valve spool 47. The force exerted by the hydraulic fluid at said secondary control pressure is added to the force exerted by spring 53.

At the same time, the servo-valve assembly also receives hydraulic fluid via conduit 97. This hydraulic fluid continues across the spool chamber to port 39 which is connected via conduit 69 to the port 65 of hydraulic cylinder 55. The incoming hydraulic fluid enters chamber 61 and causes the hydraulic cylinder 55 to move in one direction towards the front of the bandsaw. Since the piston 57 is fixed by virtue of the anchoring affect of the piston rod 59, hydraulic fluid will exit from chamber 63 through port 67. The exiting fluid will continue through conduit 67 to port 43 in the servo-valve assembly. From here, the exiting fluid will pass through the spool chamber to the port 45 where it will continue via conduit 99 through control valve assembly 87 to the tank T.

Any movement of the cylinder 55 is of course accompanied by corresponding movement of the servo-valve assembly 29 which is carried thereon. Consequently, the valve spool 47 will act on the rod member 25 to produce a corresponding axial movement of the rod 25 as long as the spool 47 is held by the combined action of the spring 53 and the fluid pressure of the hydraulic fluid received through port 35 in the condition shown in FIG. 2. Accordingly, the arm member 23 and the sprocket 21 carried thereon will move with the rod 25, the result being that the workpiece W will be pulled by the chain 13 towards the cutting blade 9. As this occurs, the operator need only steer and manipulate the workpiece so as to enable the cutting blade 9 to follow the prescribed cutting path.

It will of course be appreciated that during a cutting operation, certain forces will oppose movement of the workpiece towards the cutting blade. These forces will vary depending on the sharpness of the blade, the radius of curvature of the line of cut, the hardness of the workpiece, etc. At times, an opposing force will also be exerted by the operator as he pulls the workpiece back to slow, stop or reverse workpiece movement in relation to the blade. These opposing forces will be transmitted through the chain 13 and the arm 23 to the rod 25. If these opposing forces are large enough to overcome the combined force acting on the opposite end of the valve spool 47 (biasing action of spring 53 plus pressure of hydraulic fluid received through port 35), the spool 47 will be shifted away from the bore 33. As this occurs, the enlarged diameter portion 47c of the spool 47 will gradually close the port 45. As a result, the flow of hydraulic fluid exiting from chamber 63 will be slowed, and this in turn will slow the movement of the cylinder 55. Should the workpiece W be stopped, the spool 47 will undergo further movement which will completely close the port 45 and thus completely stop movement of cylinder 55. When the cylinder 55 is slowed or stopped, the discharge of pump 73 will be returned to the tank T via relief valve 77. Also, when the valve spool 47 is moved rearwardly in the spool chamber 31 by the rod member 25, the hydraulic fluid acting on the end of the spool will be returned to the tank T through the pressure regulating relief valve 93. Thus, it will be seen that the system of the present invention will react automatically to opposing forces tending to slow or stop forward movement of the workpiece W towards the blade 9.

If the operator should pull the workpiece W away from the cutting blade 9, the resulting force exerted on the spool 47 via the rod member 25 will cause the spool to move to a point at which port 37 is connected via port 41 to port 43, thereby feeding hydraulic fluid into chamber 63. Because of the difference in surface area between the top of the piston 57 and the piston bottom (due to the cross-sectional area of piston rod 59) the hyraulic cylinder 55 will be pushed in the reverse direction along with the servo-valve assembly 29. Fluid exiting from chamber 61 will be bled back through conduit 69 to the spool chamber 31.

When it becomes necessary to manually slow or stop advancement of the workpiece, the foot lever 43 may be depressed to actuate the hydraulic control valve assembly 85. As previously discussed, a depression of lever 143 will produce a further reduction in the pressure of the hydraulic fluid exiting from port 111, and this in turn will decrease the cumulative force being exerted on the end of the valve spool 47. By reducing this cumulative force, the valve spool 47 is allowed to shift rearwardly in response to the force being exerted by rod 25 with the result that the cylinder 55 will either be slowed or stopped.

The directional control valve 87 may also be set by lever 101 to a position midway between the position shown by the solid and phantom lines in FIG. 2. At this midway setting, hydraulic fluid is prevented from flowing to the cylinder 55 and the servo-valve assembly 29, thereby allowing the workpiece W to remain completely at rest.

When a cut has been completed on the workpiece W, the directional control valve 87 is set to the position shown by the phantom lines in FIG. 2. At this setting, hydraulic fluid will flow into the chamber 63 of hydraulic cylinder 55 from the conduit 99 through the servo-valve assembly 29, and hydraulic fluid in the chamber 61 will flow through the servo-valve assembly 29 and the control valve 87 to the tank T. Thus, the hydraulic cylinder 55 and the servo-valve assembly 29 with the rod member 25 are returned to their original position where the cutting operation started, and accordingly the chain 13 will be free for disengagement from the workpiece.

We claim:

1. In a saw having a cutting blade arranged to cut a workpiece supported on a table, a feed mechanism for urging the workpiece towards the cutting blade, said feed mechanism comprising: a driving component movable in opposite directions in response to the application thereto of hydraulic fluid pressure; valve means responsive to the forces opposing movement of the workpiece towards the cutting blade for controlling the application of hydraulic fluid pressure to said driving component, said valve means having a valve body connected to and movable with said driving component, and a valve spool axially movable within said valve body in a direction parallel to the direction of movement of said drive component; and workpiece engaging means responsive to movement of said driving component in one direction for urging the workpiece towards the cutting blade and for accommodating movement of the workpiece away from the cutting blade during movement of the driving component in the opposite direction, said workpiece engaging means having an endless flexible element trained around a plurality of rotatable idlers, some of said idlers being mounted at stationary locations on said table and at least one of said idlers being carried on an arm extending laterally from an elongated rod, the said rod being axially reciprocal in a direction parallel to the direction of movement of said driving component and being acted upon by said valve spool.

2. The apparatus of claim 1 wherein said driving component is the cylinder of a piston-cylinder assembly and wherein the piston of said assembly is fixed relative to said table.

3. The apparatus of claim 1 wherein said valve spool is acted upon by hydraulic fluid pressure in a direction opposite to the force exerted thereon by said rod.

4. The apparatus of claim 3 further comprising means for adjusting the position of said arm along the length of said rod.

5. The apparatus of claim 3 further comprising control means for varying the hydraulic fluid pressure acting on said valve spool.

6. The apparatus of claim 5 wherein said control means includes an adjustable relief valve.

7. The apparatus of claim 5 wherein said control means includes a manually adjustable control valve.

* * * * *